Dec. 24, 1929.  F. H. LEAR  1,740,948
LIFE SAVING DEVICE FOR SUBMARINES
Filed April 17, 1928  4 Sheets-Sheet 4
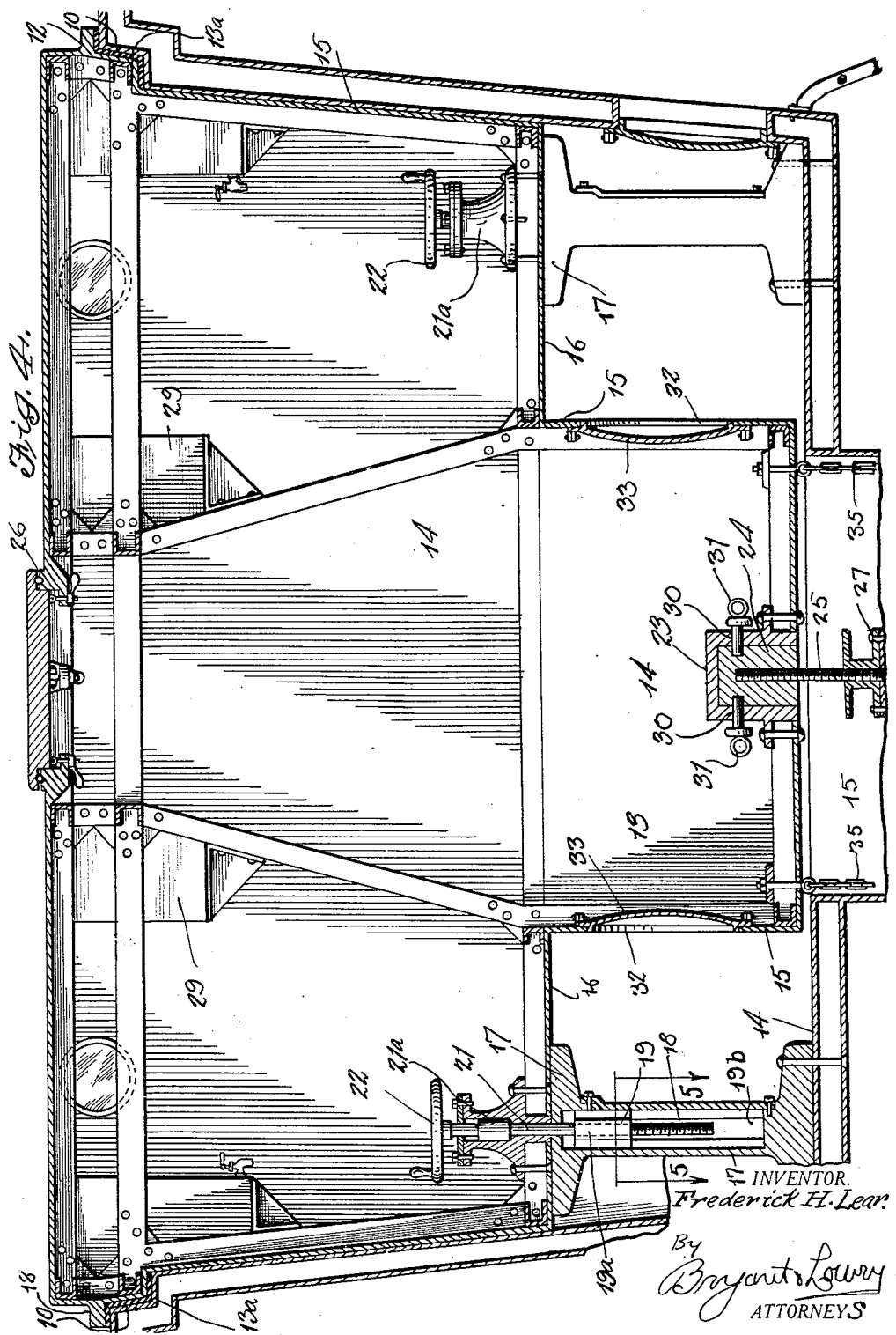

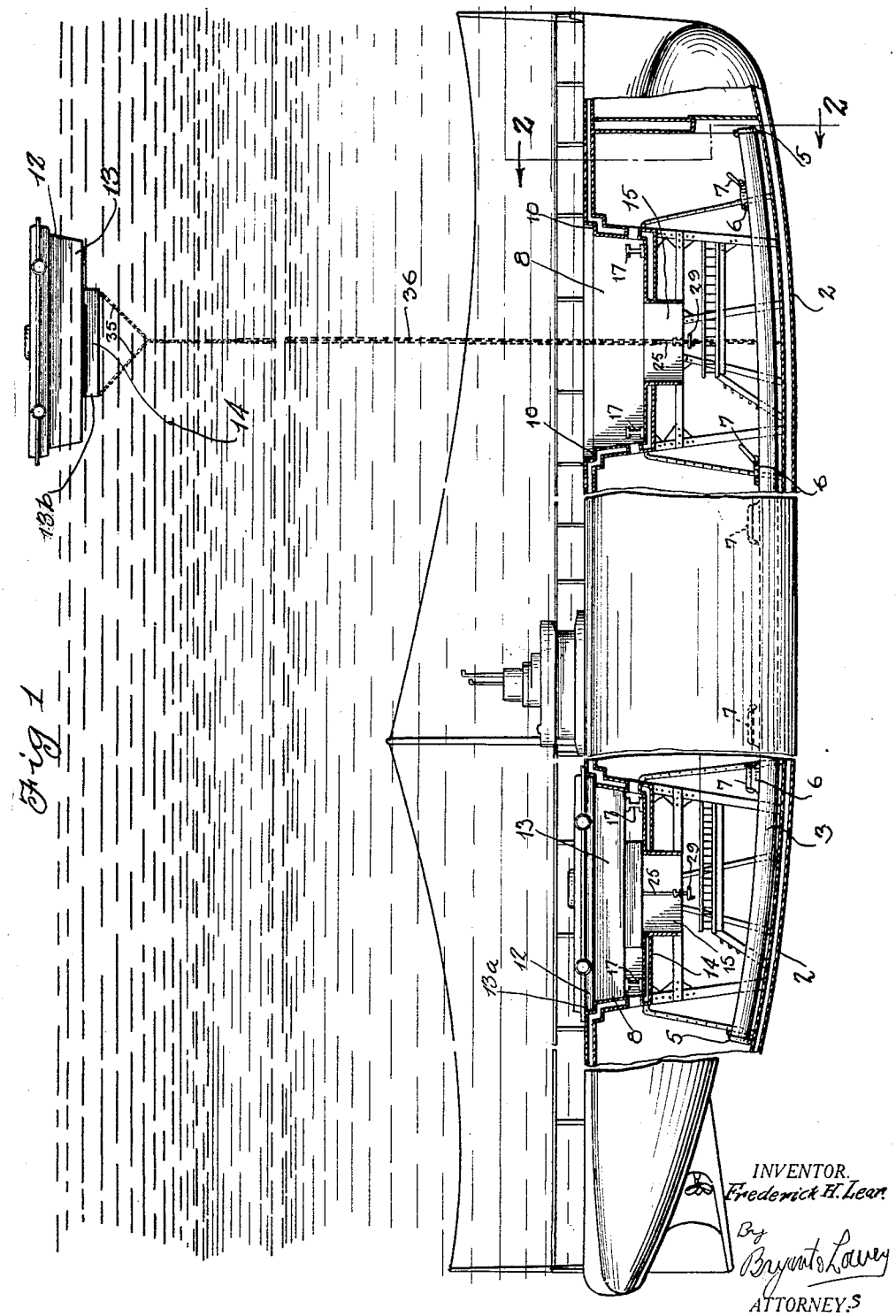

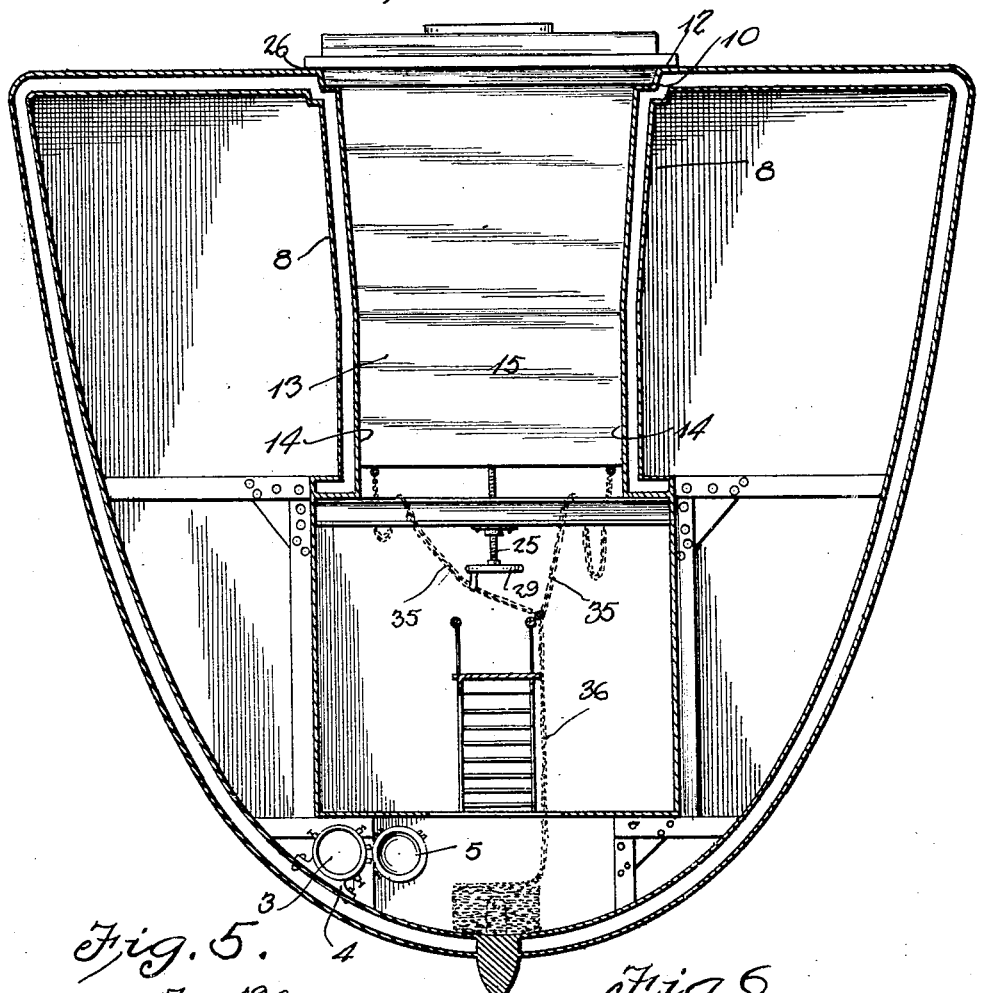
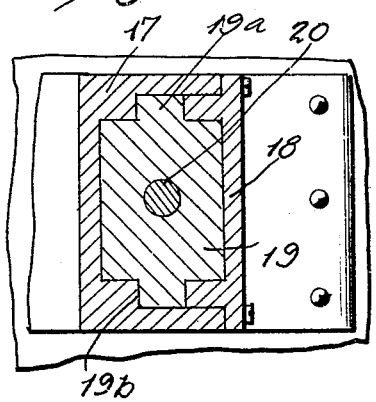
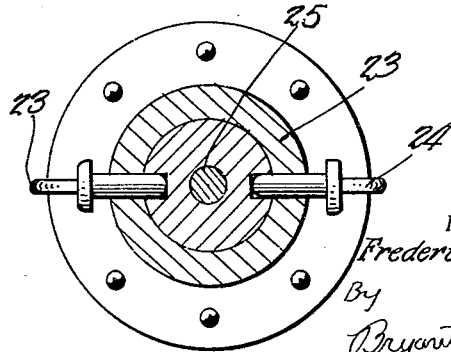

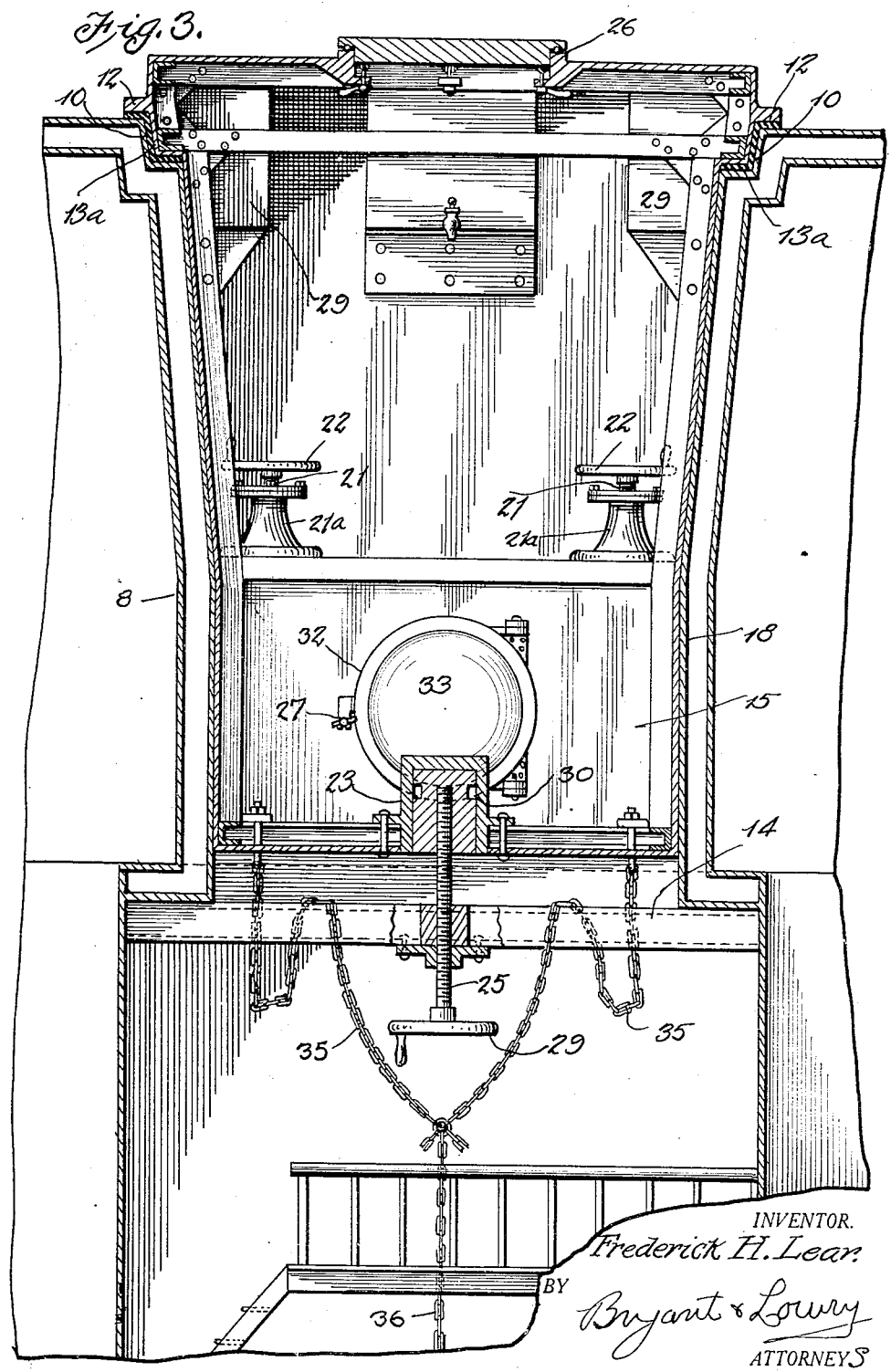

Patented Dec. 24, 1929

1,740,948

UNITED STATES PATENT OFFICE

FREDERICK H. LEAR, OF SOUTH AMBOY, NEW JERSEY

LIFE-SAVING DEVICE FOR SUBMARINES

Application filed April 17, 1928. Serial No. 270,692.

This invention relates to life saving apparatus particularly intended and adapted for use in connection with submarine vessels. The object of the invention is to provide means of escape from sunken vessels and for this purpose embodies the idea of and means for the utilization of a float or floats constituting a regular and established part of the equipment of the vessel and so disposed as to be easily accessible to the members of the crew in the event of disaster.

The invention consists in the provision as part of a marine vessel's equipment of one or more floats of a size and construction to accommodate the members of the crew or others occupying the vessel, the vessel being constructed with chambers or walls for the reception of the floats, and means being provided for the entrance and exit of the occupants of the float.

The invention further consists of and comprises means for securing the floats in position and for releasing the same when it becomes necessary to use them for the escape of the occupants of the vessel.

In carrying my invention into effect and adapting the same to a submarine vessel of the ordinary type, I so construct the latter as to provide one or more chambers for the reception of the floats, such chambers being in the general form of wells opening through the deck of the vessel and walled at the sides by means of metallic partitions separating the float chambers from the rest of the vessel. These float chambers are preferably located fore and aft respectively of the midship position, and are provided with doorways or openings for the entrance and exit of the members of the crew, said door ways having suitable hinged closures, or doors, which when closed will be substantially watertight. The floats are constituted of metallic side, top and bottom walls attached to suitable supporting beams preferably of channel formation.

The float when out of service rests on suitable beams mounted on horizontal members of the vessel framing and has attached to it a chamber, chains running from the bottom of the float to the lower part of the hold where provision is made for storing it.

The body or hull of the vessel is as usual divided into a number of compartments separated by partitions attached to the frame work and communicating with each other in the usual manner by passage ways having doors or gates.

For the purposes of my invention, and in order that the float chamber may be reached from any part of the hull or hold of the vessel, the latter is provided with a tube or tubes, running lengthwise of the hull and supported at the bottom thereof. This tube is of sufficient diameter to allow it to be passed through by crawling, and is entered by way of end openings, and also by way of side openings, such openings being provided with suitable watertight closures. These tubes pass through all the chambers or compartments of the vessel, and may be entered from each chamber or from such as may be occupied by the crew.

This tube is intended and adapted particularly as a passageway from any part of the vessel to the float chambers, or from one chamber or walled in chamber to another. The float chamber is entered from adjacent chambers, accessible from the tube, by means of ladders, stages and other means of communication, the arrangement being such that the float chambers may be reached with certainty and security from any part of the occupied enclosures of the hull.

In the accompanying drawings which illustrate my invention as embodied in or applied to a submarine vessel of conventional or approved type, Figure 1 is a side elevation, partly in section of a submarine in submerged position, with the float elevated to the surface of the water;

Figure 2 is a transverse sectional view on an enlarged scale on the line $x$—$x$ of Figure 1, with the float located in the float chamber;

Figure 3 is a vertical transverse section of the float;

Figure 4 is a vertical longitudinal section of the float shown in connection with the float chamber;

Figures 5 and 6 are detail views which will be hereinafter referred to.

Referring now more particularly to Fig. 1, 2 designates the hull or body of a submarine of usual construction, which need not be specifically described, as my invention is applicable to submarines of any construction, as well as to other marine vessels.

Fig. 1 of the drawing illustrates a submarine equipped with two installments of the float and its appurtenances.

The reference numeral 3 designates a metallic tube located in the hold or bottom part of the hull 2, and running lengthwise of the vessel. This tube is suitably supported on legs or standards 4 and extends the entire distance between the chambers at opposite ends of the hull. This tube, which is of sufficiently large diameter to allow a crouching or crawling individual to pass through it, has open ends, normally closed by hinged closures or gates 5, and, at intervals, corresponding to different chambers or compartments of the vessel has lateral openings 6, similarly closed by gates 7, so that the tube may be entered and left at any of the described openings.

While but one tube is illustrated in the drawings, two or more similar tubes may be provided, and will, be necessary for full security where the hold is divided into lateral compartments by longitudinal partitions.

As illustrated in Fig. 1, the hull 2 is formed with two float holding chambers 8, 8 located, respectively, fore and aft of midship. It will be necessary to describe but one of these chambers and floats as both are alike. Directing attention to either of these chambers it will be seen to consist of suitable framing and enclosing walls forming in its upper section, and opening at the deck level, a chamber 8 of slightly tapered form, the side walls converging towards their lower ends.

The float chamber 8 may be of any suitable size or shape, the drawing illustrating it as being rectangular and oblong, its greatest length being longitudinal of the deck. At the coincident upper terminal of the float chamber with the deck, there is an offset or ledge 10 formed to receive the correspondingly shelved or flanged portion 12 of the float 13, which as will be seen, is so shaped as to closely fit within the upper part of the float chamber.

To render the seam left between the float and the upper edge of the float chamber water-tight, there may be interposed between their correspondingly flanged portions a packing band 13$^a$ of rubber or other material. (See Figs. 4 and 5).

The numeral 14 designates the floor of the float chamber, located approximately midway between the bottom of the hull, and formed with a central cylindrical tubular walled opening 15.

The float is formed with a lower section 13$^b$ communicating with and constituting part of the interior chamber of the float. The section 13, 13$^a$ composed of vertical side and end walls 14$^a$ and 15 respectively is of less width than length and of substantially rectangular form, whereby the projecting floor portions 16 of the upper section extend lengthwise of the vessel and when the float is in its chamber, these extensions 16 rest on the T-shaped legs or standard 17, which are bolted to the floor of the float chamber. The legs 17 are formed with vertical longitudinal chambers 18, in which move pistons or blocks 19 having screw threaded bores, through which pass the vertical correspondingly threaded bolts 20 which pass through standards or posts 21$^a$ bolted to the extensions 16 of the float and are provided, at their upper ends, with hand wheels 22 whereby the bolts 20 may be turned and the pistons or blocks 19 raised or lowered to lock or unlock the float. By means of the bolts 20 and connections the float may be tightened down in its chamber and the seams between its walls and those of the float chamber tightened up and sealed. To prevent the blocks 19 from turning, they are formed with longitudinal feathers or splines 19$^a$, which project into grooves 19$^b$ in the legs 18 and interlock with the latter.

As a further means of securing the float in place, a chambered boss 23 is mounted on and secured to the floor of the lower section of the float, and receives a block 24, having an upwardly extending threaded screw seat, which engages a threaded set bolt 25, having its bearing in a block or plate 27 secured to one of the frame beams of the vessel. A band wheel 29 on the lower end of the bolt 25 constitutes the means for adjusting the block 27. This block is formed with horizontal sockets 30, which receive locking pins 31, passing thereinto from the outside of the boss 23.

Access is had to the interior of the float by means of openings 32 in the end walls of its lower section to close which gates 33 are provided and are fastened when closed by suitable latch mechanism 25.

Exit from the float is afforded through a trap or opening 26 in the top, closed when necessary by means of a hatch hinged to the float and secured inside the latter by suitable lock or latch mechanism 27. The interior of the float may be furnished with tanks 29 for oxygen to be discharged into the float when necessary.

To the floor of the lower section of the float a plurality of chains 35 are secured and these are connected below the float chamber to another chain 36 which extends downward and is shackled to the keel of the vessel. The purpose of these chains is to provide means for raising the sunken vessel, which chains will be carried up by the float when rising to the surface, where the chains will be attached to appropriate lifting appliances.

It is to be understood that all openings having closures or gates are to be provided with securable sealing rings or bands.

Assuming that the float is located within its receiving chamber, and that escape becomes necessary from a submerged vessel, the occupants will reach the float by way of the tube and the various inlets and outlets. The gates or closures to the float, are to be then closed. The fore and aft bolts (21) are then released by turning the wheels 22 and if necessary oxygen is turned on from the tanks. The float is now disengaged from the block 30 previous to which it may be somewhat raised by means of the bolt 25. The float will now rise by reason of its buoyancy, and the occupants will leave the same at the surface of the water.

What I claim as new is:—

1. A marine vessel of the character described, having a float receiving chamber opening through the deck of the vessel, and communicating with the compartments in the hold of the latter, by openings in the walls of the chamber having sealable closing means, screw blocks carried by the vessel and mounted for sliding and non-rotating movement and screws carried by the float and operable interiorly thereof for engagement with the blocks to anchor the float in the float receiving chamber of the vessel.

2. A marine vessel of the character described having a chamber opening through the deck, with apertures in its walls for the passage of members of the crew, and adapted for the reception and seating of a float, of a tube seated in the lower part of the hold having openings for the entrance and exit of the occupants of the vessel, means for closing and sealing said openings, and unobstructed means of communication between the tube, the chambers through which it passes, and the float seating chamber.

3. A marine vessel of the character described, having a float receiving chamber opening through the deck of the vessel, and communicating with the compartments in the hold of the latter, by openings in the walls of the chamber having sealable closing means, screw blocks carried by the vessel and mounted for sliding and non-rotating movement and screws carried by the float and operable interiorly thereof for engagement with the blocks for anchoring the float in the float receiving chamber, an interfitting connection between the float and vessel and locking pins securing the interfitting parts together.

In testimony whereof I affix my signature.

FREDERICK H. LEAR.